United States Patent
Shin et al.

(10) Patent No.: US 8,512,870 B2
(45) Date of Patent: Aug. 20, 2013

(54) TRANSPARENT RESIN FOR ENCAPSULATION MATERIAL AND ELECTRONIC DEVICE INCLUDING THE SAME

(75) Inventors: June-Ho Shin, Uiwang-si (KR); Sang-Ran Koh, Uiwang-si (KR); Sung-Hwan Cha, Uiwang-si (KR); Hyun-Jung Ahn, Uiwang-si (KR); Young-Eun Choi, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 13/535,956

(22) Filed: Jun. 28, 2012

(65) Prior Publication Data

US 2012/0271006 A1 Oct. 25, 2012

Related U.S. Application Data

(63) Continuation of application No. PCT/KR2010/008928, filed on Dec. 14, 2010.

(30) Foreign Application Priority Data

Dec. 30, 2009 (KR) ........................ 10-2009-0134327

(51) Int. Cl.
*B32B 9/04* (2006.01)

(52) U.S. Cl.
USPC ................... 428/447; 528/9; 528/15; 528/32; 528/43; 528/395; 525/477

(58) Field of Classification Search
None
See application file for complete search history.

(56) References Cited

U.S. PATENT DOCUMENTS

| | | | |
|---|---|---|---|
| 5,596,060 A * | 1/1997 | Kushibiki et al. | 528/15 |
| 7,057,002 B2 | 6/2006 | Lee et al. | |
| 7,198,823 B2 | 4/2007 | Lee et al. | |
| 7,374,820 B2 | 5/2008 | Lee et al. | |
| 2004/0198924 A1 | 10/2004 | Young et al. | |
| 2005/0014009 A1 | 1/2005 | Lee et al. | |
| 2006/0081864 A1 | 4/2006 | Nakazawa | |
| 2006/0141269 A1 | 6/2006 | Lee et al. | |
| 2007/0154725 A1 | 7/2007 | Lee et al. | |
| 2007/0287208 A1 | 12/2007 | Thompson et al. | |
| 2008/0220266 A1 | 9/2008 | Murai et al. | |
| 2008/0303418 A1 | 12/2008 | Fujita et al. | |

FOREIGN PATENT DOCUMENTS

| | | |
|---|---|---|
| JP | 08-231728 A | 9/1996 |
| JP | 2009-001475 A | 1/2009 |
| KR | 10 2005-0008048 A | 1/2005 |
| KR | 10 2005-0119375 A | 12/2005 |
| KR | 10 2006-0016107 A | 2/2006 |
| KR | 10-0647594 B1 | 11/2006 |
| KR | 10 2008-0047731 A | 5/2008 |
| KR | 10 2008-0081838 | 9/2008 |
| WO | WO 2005/123750 A1 | 12/2005 |
| WO | WO 2008/097877 A2 * | 8/2008 |

OTHER PUBLICATIONS

International Search Report in PCT/2010/008928, dated Aug. 26, 2011 (Shin, et al.).

* cited by examiner

*Primary Examiner* — Marc Zimmer
(74) *Attorney, Agent, or Firm* — Lee & Morse, P.C.

(57) ABSTRACT

A transparent resin for an encapsulation material, including a polymetallosiloxane obtained from at least one metal compound represented by Chemical Formulae 1A to 1D copolymerized with a silicon compound including a compound represented by Chemical Formula 2:

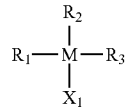

[Chemical Formula 1A]

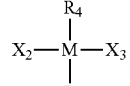

[Chemical Formula 1B]

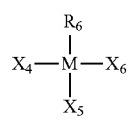

[Chemical Formula 1C]

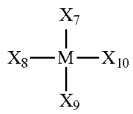

[Chemical Formula 1D]

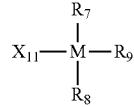

[Chemical Formula 2]

17 Claims, 1 Drawing Sheet

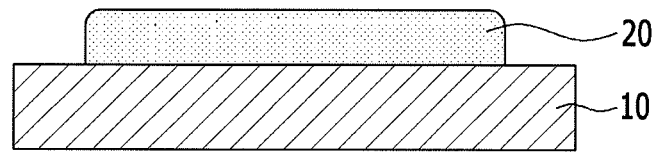

TRANSPARENT RESIN FOR ENCAPSULATION MATERIAL AND ELECTRONIC DEVICE INCLUDING THE SAME

CROSS-REFERENCE TO RELATED APPLICATIONS

This application is a continuation under 35 U.S.C. §120 of pending International Application No. PCT/KR2010/008928, entitled "Transparent Resin for Encapsulation Material and Electronic Device Including the Same," which was filed on Dec. 14, 2010, the entire contents of which is hereby incorporated by reference.

This application claims priority under 35 U.S.C. §119 to Korean Patent Application No. 10-2009-0134327, entitled "Transparent Resin for Encapsulation Material and Electronic Device Including the Same," which was filed on Dec. 30, 2009, in the Korean Intellectual Property Office, the entire contents of which is hereby incorporated by reference.

BACKGROUND

1. Field

Embodiments relate to a transparent resin for an encapsulation material and an electronic device including the same.

2. Description of the Related Art

A light emitting element such as a light emitting diode (LED), an organic light emitting diode (OLED) device, a photoluminescent (PL) device, and the like may be used in diverse areas, such as a domestic electric device, a lighting device, a display device, various automatic devices, and the like.

In a light emitting region, the light emitting element may display intrinsic colors of a light emitting material such as blue, red, and green, or white light may be displayed by combining light emitting materials displaying different colors.

SUMMARY

Embodiments are directed to a transparent resin for an encapsulation material, including a polymetallosiloxane obtained from at least one metal compound represented by Chemical Formulae 1A to 1D copolymerized with a silicon compound including a compound represented by Chemical Formula 2:

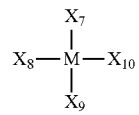

[Chemical Formula 1A]

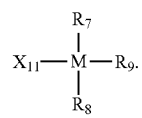

[Chemical Formula 1B]

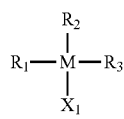

[Chemical Formula 1C]

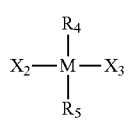

[Chemical Formula 1D]

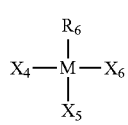

[Chemical Formula 2]

In Chemical Formulae 1A to 1D, each M may be independently selected from a metal or semi-metal element of a fourth period of the Periodic Table, $R_1$ to $R_6$ each independently may be hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted carbonyl group, a hydroxy group, or a combination thereof, and $X_1$ to $X_{10}$ each independently may be one selected from a C1 to C30 alkoxy group, a hydroxy group, and a halogen atom.

In Chemical Formula 2, $R_7$ to $R_9$ each independently may be hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted carbonyl group, a hydroxy group, or a combination thereof, and $X_{11}$ may be one selected from a C1 to C30 alkoxy group, a hydroxy group, and a halogen atom.

M may include germanium or titanium.

M may include germanium, and the at least one metal compound may include an alkyl dihalogenated germanium, an aryl dihalogenated germanium, an alkenyl dihalogenated germanium, an alkyl trihalogenated germanium, an aryl trihalogenated germanium, an alkenyl trihalogenated germanium, a tetrahalogenated germanium, an alkyl dialkoxy germanium, an aryl dialkoxy germanium, an alkenyl dialkoxy germanium, an alkyl trialkoxy germanium, an aryl trialkoxy germanium, an alkenyl trialkoxy germanium, or a tetraalkoxy germanium.

M may include titanium, and the at least one metal compound may include a trihalogenated titanium, a tetraalkoxy titanium, or a tetrahalogenated titanium.

The silicon compound may further include at least one selected from compounds represented by Chemical Formulae 3 to 5.

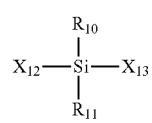

[Chemical Formula 3]

-continued

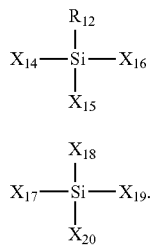
[Chemical Formula 4]

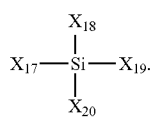
[Chemical Formula 5]

In Chemical Formulae 3 to 5, $R_{10}$ to $R_{12}$ each independently may be hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted carbonyl group, a hydroxy group, or a combination thereof, and $X_{12}$ to $X_{20}$ each independently may be one selected from a C1 to C30 alkoxy group, a hydroxy group, and a halogen atom.

The polymetallosiloxane may be a compound represented by Chemical Formula 6:

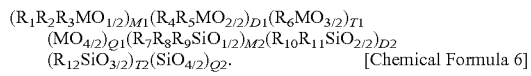
[Chemical Formula 6]

In Chemical Formula 6, each M independently may be selected from a metal or semi-metal element of a fourth period of the Periodic Table, $R_1$ to $R_{12}$ each independently may be hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted carbonyl group, a hydroxy group, or a combination thereof, $0 \leq M1<1$, $0 \leq D1<1$, $0<T1<1$, $0 \leq Q1<1$, $0<M2<1$, $0 \leq D2<1$, $0 \leq T2<1$, $0 \leq Q2<1$, and $M1+D1+T1+Q1+M2+D2+T2+Q2=1$.

M may include germanium or titanium.

The polymetallosiloxane may be included in an amount of about 1 wt % to about 70 wt % based on a total amount of the transparent resin.

The transparent resin may further include a hydrosilation catalyst.

The hydrosilation catalyst may include platinum, rhodium, palladium, ruthenium, iridium, or a combination thereof.

The hydrosilation catalyst may be included in an amount of about 0.1 ppm to about 100 ppm based on a total amount of the transparent resin.

The transparent resin may further include a polyorganosiloxane represented by Chemical Formula 7:

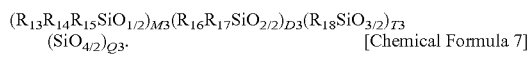
[Chemical Formula 7]

In Chemical Formula 7, $R_{13}$ to $R_{18}$ each independently may be hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted carbonyl group, a hydroxy group, or a combination thereof, $0<M3<1$, $0 \leq D3<1$, $0 \leq T3<1$, $0 \leq Q3<1$, and $M3+D3+T3+Q3=1$.

The polyorganosiloxane may be included in an amount of about 30 wt % to about 99 wt % based on a total amount of the transparent resin.

Embodiments are also directed to a transparent resin for an encapsulation material, including a polymetallosiloxane represented by Chemical Formula 6:

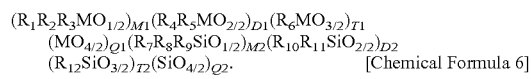
[Chemical Formula 6]

In Chemical Formula 6, each M independently may be selected from a metal or semi-metal element of a fourth period of the Periodic Table, $R_1$ to $R_{12}$ each independently may be hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted carbonyl group, a hydroxy group, or a combination thereof, $0 \leq M1<1$, $0 \leq D1<1$, $0<T1<1$, $0 \leq Q1<1$, $0<M2<1$, $0 \leq D2<1$, $0 \leq T2<1$, $0 \leq Q2<1$, $M1+D1+T1+Q1+M2+D2+T2+Q2=1$, and D2 or T2 may be greater than zero.

M may include germanium or titanium.

The transparent resin may further include a hydrosilation catalyst.

The hydrosilation catalyst may include platinum, rhodium, palladium, ruthenium, iridium, or a combination thereof.

The transparent resin may further include a polyorganosiloxane represented by Chemical Formula 7:

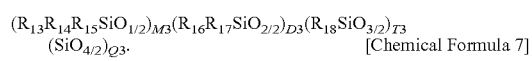
[Chemical Formula 7]

In Chemical Formula 7, $R_{13}$ to $R_{18}$ each independently may be hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted carbonyl group, a hydroxy group, or a combination thereof, $0<M3<1$, $0 \leq D3<1$, $0 \leq T3<1$, $0 \leq Q3<1$, $M3+D3+T3+Q3=1$, and D3 or T3 may be greater than zero.

Embodiments are also directed to an electronic device, including an encapsulation material obtained by curing the transparent resin according to an embodiment.

The electronic device may further include a light emitting diode, an organic light emitting diode device, a photo luminescent device, or a solar cell.

BRIEF DESCRIPTION OF THE DRAWING

Features will become apparent to those of skill in the art by describing in detail exemplary embodiments with reference to the attached drawing in which:

FIG. 1 illustrates a view of an electronic device according to an embodiment.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing FIGURE, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

As used herein, the term "and/or" includes any and all combinations of one or more of the associated listed items. Expressions such as "at least one of," when preceding a list of items, modify the entire list of items and do not modify the individual items of the list.

As used herein, when a definition is not otherwise provided, the term "substituted" refers to one substituted with at least a substituent selected from the group of a halogen (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C30 alkyl group, a C2 to C16 alkenyl group, a C2 to C16 alkynyl group, a C6 to C30 aryl group, a C7 to C13 arylalkyl group, a C1 to C4 oxyalkyl group, a C1 to C20 heteroalkyl group, a C3 to C20 heteroarylalkyl group, a cycloalkyl group, a C3 to C15 cycloalkenyl group, a C6 to C15 cycloalkynyl group, a C2 to C20 heterocycloalkyl group, and a combination thereof.

As used herein, when a definition is not otherwise provided, the prefix "hetero" refers to one including 1 to 3 heteroatoms selected from N, O, S, and P.

The transparent resin according to an embodiment includes a polymetallosiloxane obtained from copolymerization of a silicon compound and a metal compound.

The metal compound may include at least one metal compound represented by the following Chemical Formula 1A to Chemical Formula 1D.

[Chemical Formula 1A]

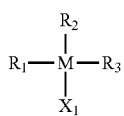

[Chemical Formula 1B]

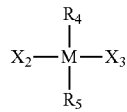

[Chemical Formula 1C]

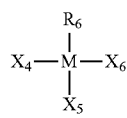

[Chemical Formula 1D]

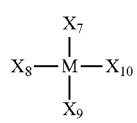

In Chemical Formulae 1A to 1D, each M independently may be a metal or semi-metal element of the fourth period of the Periodic Table, for example Ge, Ti, Zn, Ga, V, Cr, Mn, Fe, Co, Ni, or a combination thereof. In particular, M may include germanium (Ge) or titanium (Ti).

$R_1$ to $R_6$ each independently may be hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted carbonyl group, a hydroxy group, or a combination thereof.

$X_1$ to $X_{10}$ each independently may be one selected from a C1 to C30 alkoxy group, a hydroxy group, and a halogen atom.

When M is germanium (Ge), the polymetallosiloxane may be a polygermanosiloxane.

The polygermanosiloxane may include, for example, an alkyl dihalogenated germanium, an aryl dihalogenated germanium, an alkenyl dihalogenated germanium, an alkyl trihalogenated germanium, an aryl trihalogenated germanium, an alkenyl trihalogenated germanium, a tetrahalogenated germanium, an alkyl dialkoxy germanium, an aryl dialkoxy germanium, an alkenyl dialkoxy germanium, an alkyl trialkoxy germanium, an aryl trialkoxy germanium, an alkenyl trialkoxy germanium, a tetraalkoxy germanium, or a combination thereof.

When M is titanium (Ti), the polymetallosiloxane may be polytitanosiloxane.

The polytitanosiloxane may include, for example a trihalogenated titanium, a tetraalkoxy titanium, a tetrahalogenated titanium, or a combination thereof.

The silicon compound may include a compound represented by the following Chemical Formula 2.

[Chemical Formula 2]

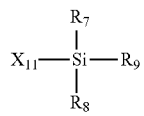

In Chemical Formula 2, $R_7$ to $R_9$ each independently may be hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted carbonyl group, a hydroxy group, or a combination thereof.

$X_{11}$ may be one selected from a C1 to C30 alkoxy group, a hydroxy group, and a halogen atom.

The silicon compound may include at least one selected from the compounds represented by the following Chemical Formula 3, the following Chemical Formula 4, and the following Chemical Formula 5.

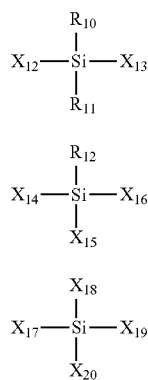

[Chemical Formula 3]

[Chemical Formula 4]

[Chemical Formula 5]

In Chemical Formulae 3 to 5, $R_{10}$ to $R_{12}$ each independently may be hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted carbonyl group, a hydroxy group, or a combination thereof.

$X_{12}$ to $X_{20}$ each independently may be one selected from a C1 to C30 alkoxy group, a hydroxy group, and a halogen atom.

The polymetallosiloxane may be a compound represented by the following Chemical Formula 6.

$(R_1R_2R_3MO_{1/2})_{M1}(R_4R_5MO_{2/2})_{D1}(R_6MO_{3/2})_{T1}$
$(MO_{4/2})_{Q1}(R_7R_8R_9SiO_{1/2})_{M2}(R_{10}R_{11}SiO_{2/2})_{D2}$
$(R_{12}SiO_{3/2})_{T2}(SiO_{4/2})_{Q2}$ [Chemical Formula 6]

In Chemical Formula 6, each M independently may be a metal or semi-metal element of the fourth period of the Periodic Table, for example Ge, Ti, Zn, Ga, V, Cr, Mn, Fe, Co, Ni, or a combination thereof. In particular, M may include germanium (Ge) or titanium (Ti).

$R_1$ to $R_{12}$ each independently may be hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted carbonyl group, a hydroxy group, or a combination thereof.

M1, D1, T1, Q1, M2, D2, T2, and Q2 may denote mole ratios of the respective units, $0 \leq M1 < 1$, $0 \leq D1 < 1$, $0 < T1 < 1$, $0 \leq Q1 < 1$, $0 < M2 < 1$, $0 \leq D2 < 1$, $0 \leq T2 < 1$, $0 \leq Q2 < 1$, and M1+D1+T1+Q1+M2+D2+T2+Q2=1.

The polymetallosiloxane may have a weight average molecular weight of about 100 to about 100,000 g/mol, and for example about 300 to about 20,000 g/mol.

The polymetallosiloxane may be included in an amount of about 1 wt % to about 70 wt % based on the total amount of the transparent resin.

The transparent resin may further include a hydrosilation catalyst.

The hydrosilation catalyst may be included in an amount of about 0.1 ppm to about 100 ppm based on the total amount of the transparent resin.

The transparent resin may further include a polyorganosiloxane represented by the following Chemical Formula 7.

$(R_{13}R_{14}R_{15}SiO_{1/2})_{M3}(R_{16}R_{17}SiO_{2/2})_{D3}(R_{18}SiO_{3/2})_{T3}$
$(SiO_{4/2})_{Q3}$ [Chemical Formula 7]

In Chemical Formula 7, $R_{13}$ to $R_{18}$ each independently may be hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted carbonyl group, a hydroxy group, or a combination thereof.

M3, D3, T3, and Q3 may denote mole ratios of the respective units, $0 < M3 < 1$, $0 \leq D3 < 1$, $0 \leq T3 < 1$, $0 \leq Q3 < 1$, and M3+D3+T3+Q3=1.

The polyorganosiloxane may be included in an amount of about 30 wt % to about 99 wt % based on the total amount of the transparent resin.

The transparent resin may further include an adhesion promoter, and the adhesion promoter may include, for example glycidoxypropyltrimethoxysilane, vinyltriethoxysilane, glycidoxypropyltriethoxysilane, and the like.

The transparent resin may be cured to be used as an encapsulation material of an electronic device. The electronic device may include a suitable electronic device, for example a light emitting diode, an organic light emitting device, a photo luminescent device, a solar cell, and the like. Referring to FIG. 1, an electronic device, e.g., a light emitting element, a solar cell, etc., may be provided in a packaging or encapsulating structure 20 that is disposed on a substrate 10, which may be opaque, reflective, transparent, semi-transparent, etc.

The encapsulation material made from the transparent resin may have a high transmittance and a high refractive index, while yellowing or deterioration of the encapsulation material as a result of long-term exposure to high temperature may also be substantially prevented. Thus, the encapsulation material may have improved heat resistance.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

Example 1

1 kg of a mixed solvent prepared by mixing water and toluene in a weight ratio of 5:5 was put in a three-necked flask, and 300 g of a mixture prepared by mixing phenyltrichlorosilane, phenyltrichlorogermane, and vinyldimethylchlorosilane in a mole ratio of 85:5:10 was added thereto in a dropwise fashion for 2 hours while the flask was maintained at 23° C. When the addition was complete, the resulting mixture was refluxed and heated at 90° C. for 3 hours to perform a condensation polymerization reaction. Next, the reactant was cooled down to room temperature, and a water layer therein was removed, thereby preparing a polymer solution dissolved in toluene. The polymer solution was cleaned with water to remove chlorine (a reaction byproduct). Then, the neutral polymer solution was distilled under a reduced pressure, thereby obtaining a polygermanosiloxane.

The polygermanosiloxane was measured regarding a weight average molecular weight using a gel permeation chromatography and as a result, had a weight average molecular weight reduced to polystyrene of 1700 g/mol. In addition, the polygermanosiloxane was identified to have a structure of Chemical Formula 8 using H-NMR, C-NMR, Si-NMR, and an element analyzer. Herein, Me refers to a methyl group, Ph refers to a phenyl group, Vi refers to a vinyl group, Ge refers to germanium, and Si refers to silicon.

$(Me_2ViSiO_{1/2})_{0.1}(PhSiO_{3/2})_{0.85}(PhGeO_{3/2})_{0.05}$ [Chemical Formula 8]

Example 2

A polygermanosiloxane was prepared according to the same method as Example 1 except for using phenyltrichlorosilane, phenyltrichlorogermane, and vinyldimethylchlorosilane in a mole ratio of 80:10:10.

The polygermanosiloxane was measured regarding a weight average molecular weight using a gel permeation chromatography and as a result, had a weight average molecular weight reduced to polystyrene of 2100 g/mol. In addition, the polygermanosiloxane was identified to have a structure of Chemical Formula 9 using H-NMR, C-NMR, Si-NMR, and an element analyzer.

$(Me_2ViSiO_{1/2})_{0.1}(PhSiO_{3/2})_{0.8}(PhGeO_{3/2})_{0.1}$ [Chemical Formula 9]

Example 3

A polygermanosiloxane was prepared according to the same method as Example 1 except for using phenyltrichlorosilane, phenyltrichlorogermane, and vinyldimethylchlorosilane in a mole ratio of 75:15:10.

The polygermanosiloxane was measured regarding a weight average molecular weight using a gel permeation chromatography and as a result, had a weight average molecular weight reduced to polystyrene of 2100 g/mol. In addition, the polygermanosiloxane was identified to have a structure of Chemical Formula 10 using H-NMR, C-NMR, Si-NMR, and an element analyzer.

$(Me_2ViSiO_{1/2})_{0.1}(PhSiO_{3/2})_{0.75}(PhGeO_{3/2})_{0.15}$ [Chemical Formula 10]

Example 4

A polygermanosiloxane was prepared according to the same method as Example 1 except for using 141.68 g of phenyldichlorosilane, 25.61 g of trichlorophenylgermane, and 6.72 g of tetramethyldisiloxane.

The polygermanosiloxane was measured regarding a weight average molecular weight using a gel permeation chromatography and as a result, had a weight average molecular weight reduced to polystyrene of 1050 g/mol. In addition, the polygermanosiloxane was identified to have a structure of Chemical Formula 11 using H-NMR, C-NMR, Si-NMR, and an element analyzer.

$(Me_2HSiO_{1/2})_{0.1}(PhHSiO_{2/2})_{0.8}(PhGeO_{3/2})_{0.1}$ [Chemical Formula 11]

Comparative Example 1

Polyorganosiloxane

A polyorganosiloxane was prepared according to the same method as Example 1 except for using no phenyltrichlorogermane as a monomer, and using phenyltrichlorosilane and vinyldimethylchlorosilane in a mole ratio of 90:10 (190.40 g of phenyltrichlorosilane and 12.07 g of vinyldimethylchlorosilane).

The polyorganosiloxane was measured regarding a weight average molecular weight using a gel permeation chromatography and as a result, had a weight average molecular weight reduced to polystyrene of 1500 g/mol. In addition, the polyorganosiloxane was identified to have a structure of Chemical Formula 12 using H-NMR, C-NMR, Si-NMR, and an element analyzer.

$(Me_2ViSiO_{1/2})_{0.1}(PhSiO_{3/2})_{0.9}$ [Chemical Formula 12]

Comparative Example 2

Polyorganosiloxane

A polyorganosiloxane was prepared according to the same method as Comparative Example 1 except for performing a condensation polymerization reaction at 80° C. for 2 hours (whereas in Example 1, condensation polymerization was performed at 90° C. for 3 hours).

The polyorganosiloxane was measured regarding a weight average molecular weight using a gel permeation chromatography and as a result, had a weight average molecular weight reduced to polystyrene of 1300 g/mol. In addition, the polyorganosiloxane was identified to have a structure of Chemical Formula 13 using H-NMR, C-NMR, Si-NMR, and an element analyzer.

$(Me_2ViSiO_{1/2})_{0.1}(PhSiO_{3/2})_{0.9}$ [Chemical Formula 13]

Comparative Example 3

Polyorganosiloxane

A polyorganosiloxane was prepared according to the same method as Example 1 except for using no phenyltrichlorogermane as a monomer, and using 159.39 g of phenyldichlorosilane and 6.72 g of tetramethyldisiloxane.

The polyorganosiloxane was measured regarding a weight average molecular weight using a gel permeation chromatography and as a result, had a weight average molecular weight reduced to polystyrene of 950 g/mol. In addition, the polyorganosiloxane was identified to have a structure of Chemical Formula 14 using H-NMR, C-NMR, Si-NMR, and an element analyzer.

$(Me_2HSiO_{1/2})_{0.1}(PhHSiO_{2/2})_{0.9}$ [Chemical Formula 14]

Evaluation—1

The polygermanosiloxanes according to Examples 1 to 3 and the polyorganosiloxanes according to Comparative Examples 1 and 2 were measured regarding transmittance and heat resistance.

The transmittance was measured by respectively dissolving the polygermanosiloxanes according to Examples 1 to 3 and the polyorganosiloxane according to Comparative Examples 1 and 2 in a toluene solvent in a weight ratio of 7:3, and measuring the solutions at wavelength of 600 nm with a UV-spectrophotometer (Shimadzu, UV-3600).

Transmittance after heating was measured according to the same method as above after heating the solution at 150° C. for 1000 hours.

The results are provided in Table 1.

TABLE 1

|  | Example 1 | Example 2 | Example 3 | Comparative Example 1 | Comparative Example 2 |
|---|---|---|---|---|---|
| Initial transmittance (%) | 96 | 96 | 96 | 95 | 95 |
| Transmittance after heating (%) | 93 | 94 | 95 | 85 | 85 |

As shown in Table 1, the polygermanosiloxanes according to Examples 1 to 3 had a similar initial transmittance to transmittance after heating after being heated at 150° C. for 1000 hours, and thus the transmittance was changed by only a small amount after the long term exposure at a high temperature. That is, the polygermanosiloxanes according to Examples 1 to 3 substantially maintained an initial transmittance, and thus had improved heat resistance. The polyorganosiloxanes according to Comparative Examples 1 and 2 became yellowish after the long term exposure at a high temperature, and had a greater deterioration in transmittance.

Preparation of Resin Composition

The polygermanosiloxanes according to Examples 2 and 4, the polyorganosiloxanes according to Comparative Examples 2 and 3, and a hydrosilation catalyst were mixed in a ratio provided in the following Table 2 (which gives amounts in parts by weight), and foam-removed under vacuum, thereby preparing a liquid resin composition. The hydrosilation catalyst was Pt-CS 2.0 (Umicore AG & Co.).

TABLE 2

|  | Polygermanosiloxane | | Polyorganosiloxane | | |
|---|---|---|---|---|---|
|  | Example 2 | Example 4 | Comparative Example 2 | Comparative Example 3 | Catalyst |
| Composition 1 | 90 | 10 | — | — | 0.05 |
| Composition 2 | 45 | 10 | 45 | — | 0.05 |
| Composition 3 | 90 | 5 | — | 5 | 0.05 |
| Composition 4 | 90 | — | — | 10 | 0.05 |
| Comparative Composition 1 | — | — | 90 | 10 | 0.05 |

Evaluation—2

The compositions 1 to 4 and the comparative composition 1 were measured regarding transmittance, transmittance after heating, and refractive index.

The transmittance and transmittance after heating were measured in the aforementioned method, and the refractive index was measured at a D-line 589 nm wavelength using an Abbe refractive index.

The results are provided in Table 3.

TABLE 3

|  | Composition 1 | Composition 2 | Composition 3 | Composition 4 | Comparative Composition 1 |
|---|---|---|---|---|---|
| Transmittance (%) | 98 | 97 | 99 | 99 | 96 |
| Transmittance after heating (%) | 94 | 93 | 96 | 95 | 86 |
| Refractive index | 1.57 | 1.56 | 1.58 | 1.57 | 1.53 |

As shown in Table 3, the compositions 1 to 4 including the polygermanosiloxane according to an embodiment had a similar initial transmittance to a transmittance after being heated at 150° C. for 1000 hours (i.e., the transmittance was changed by only a small amount, indicating improved heat resistance), and thus did not become yellowish after the long-term exposure at a high temperature. The comparative composition 1 had a remarkably lowered transmittance after heating, and became yellowish after the long-term exposure at a high temperature.

In addition, the compositions 1 to 4 had a higher refractive index than the comparative composition 1. Accordingly, the composition including the polygermanosiloxane according to an embodiment had a refractive index of greater than or equal to 1.5, and specifically, greater than or equal to 1.55.

By way of summary and review, a light emitting element may be fabricated to be a packaging or an encapsulation structure. Such a packaging or encapsulation structure may include a transparent resin through which light emitted from a light emitting material is transmitted. The transparent resin may be positioned on a place where light passes through, and characteristics of the transparent resin such as a transmittance, a refractive index, hardness, and the like may have an influence on light efficiency of the light emitting element.

A transparent resin according to an embodiment may have improved physical characteristics to substantially prevent deterioration of light efficiency. The transparent resin may not become yellowish after long-term exposure at a high temperature, and thus may have improved heat resistance as well as a high refractive index and a high transmittance.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A transparent resin for an encapsulation material, comprising:
    a polymetallosiloxane obtained from at least one metal compound represented by Chemical Formulae 1A to 1D copolymerized with a silicon compound including at least one compound represented by Chemical Formulae 2-5, provided that the at least one metal compound includes a metal compound represented by Chemical Formula 1C and the silicon compound includes a compound represented by Chemical Formula 2:

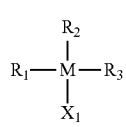
[Chemical Formula 1A]

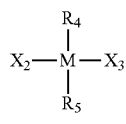
[Chemical Formula 1B]

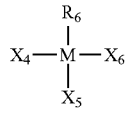
[Chemical Formula 1C]

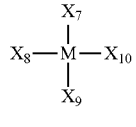
[Chemical Formula 1D]

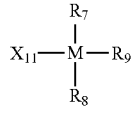
[Chemical Formula 2]

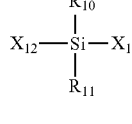
[Chemical Formula 3]

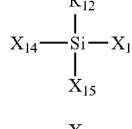
[Chemical Formula 4]

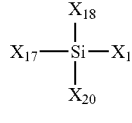
[Chemical Formula 5]

wherein, in Chemical Formulae 1A to 1D,
each M is independently selected from a metal or semi-metal element of a fourth period of the Periodic Table,
$R_1$ to $R_6$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a carbonyl group, a hydroxy group, or a combination thereof, and
$X_1$ to $X_{10}$ are each independently one selected from a C1 to C30 alkoxy group, a hydroxy group, and a halogen atom, and
wherein, in Chemical Formulae 2-5,
$R_7$ to $R_{12}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a carbonyl group, a hydroxy group, or a combination thereof, and
$X_{11}$ to $X_{20}$ are each independently one selected from a C1 to C30 alkoxy group, a hydroxy group, and a halogen atom, and
wherein the polymetallosiloxane is a compound represented by Chemical Formula 6:

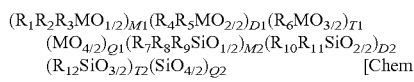
[Chemical Formula 6]

wherein, in Chemical Formula 6,
each M is independently selected from a metal or semi-metal element of a fourth period of the Periodic Table,
$R_1$ to $R_{12}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a carbonyl group, a hydroxy group, or a combination thereof,
$0 \leq M1 < 1$, $0 \leq D1 < 1$, $0 < T1 < 1$, $0 \leq Q1 < 1$, $0 < M2 < 1$, $0 \leq D2 < 1$, $0 \leq T2 < 1$, $0 \leq Q2 < 1$, and $M1+D1+T1+Q1+M2+D2+T2+Q2=1$, and
wherein the polymetallosiloxane is included in an amount of about 1 wt % to about 70 wt % based on a total amount of the transparent resin.

2. The transparent resin as claimed in claim 1, wherein M includes germanium or titanium.

3. The transparent resin as claimed in claim 2, wherein M includes germanium, and the at least one metal compound includes an alkyl dihalogenated germanium, an aryl dihalogenated germanium, an alkenyl dihalogenated germanium, an alkyl trihalogenated germanium, an aryl trihalogenated germanium, an alkenyl trihalogenated germanium, a tetrahalogenated germanium, an alkyl dialkoxy germanium, an aryl dialkoxy germanium, an alkenyl dialkoxy germanium, an alkyl trialkoxy germanium, an aryl trialkoxy germanium, an alkenyl trialkoxy germanium, or a tetraalkoxy germanium.

4. The transparent resin as claimed in claim 2, wherein M includes titanium, and the at least one metal compound includes a trihalogenated titanium, a tetraalkoxy titanium, or a tetrahalogenated titanium.

5. The transparent resin as claimed in claim 1, wherein the silicon compound further includes at least one selected from compounds represented by Chemical Formulae 3 to 5.

6. The transparent resin as claimed in claim 1, further comprising a hydrosilation catalyst.

7. The transparent resin as claimed in claim 6, wherein the hydrosilation catalyst includes platinum, rhodium, palladium, ruthenium, iridium, or a combination thereof.

8. The transparent resin as claimed in claim 7, wherein the hydrosilation catalyst is included in an amount of about 0.1 ppm to about 100 ppm based on the total amount of the transparent resin.

9. The transparent resin as claimed in claim 1, further comprising a polyorganosiloxane represented by Chemical Formula 7:

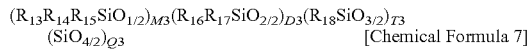
[Chemical Formula 7]

wherein, in Chemical Formula 7, $R_{13}$ to $R_{18}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a carbonyl group, a hydroxy group, or a combination thereof, $0<M3<1$, $0\leq D3<1$, $0\leq T3<1$, $0\leq Q3<1$, and $M3+D3+T3+Q3=1$.

10. The transparent resin as claimed in claim 9, wherein the polyorganosiloxane is included in an amount of about 30 wt % to about 99 wt % based on the total amount of the transparent resin.

11. An electronic device, comprising an encapsulation material obtained by curing the transparent resin as claimed in claim 1.

12. The electronic device as claimed in claim 11, wherein the electronic device comprises a light emitting diode, an organic light emitting diode device, a photo luminescent device, or a solar cell.

13. The transparent resin as claimed in claim 9, wherein, in Chemical Formula 7, D3 or T3 is greater than zero.

14. A transparent resin for an encapsulation material, comprising:

a polymetallosiloxane represented by Chemical Formula 6:

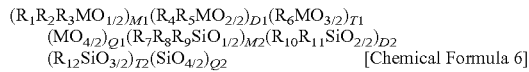
[Chemical Formula 6]

wherein, in Chemical Formula 6, each M is independently selected from a metal or semi-metal element of a fourth period of the Periodic Table, $R_1$ to $R_{12}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a carbonyl group, a hydroxy group, or a combination thereof, $0\leq M1<1$, $0\leq D1<1$, $0<T1<1$, $0\leq Q1<1$, $0<M2<1$, $0\leq D2<1$, $0\leq T2<1$, $0\leq Q2<1$, $M1+D1+T1+Q1+M2+D2+T2+Q2=1$, and D2 or T2 is greater than zero; and a polyorganosiloxane represented by Chemical Formula 7:

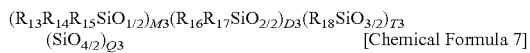
[Chemical Formula 7]

wherein, in Chemical Formula 7, $R_{13}$ to $R_{18}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, a substituted or unsubstituted C1 to C30 alkoxy group, a carbonyl group, a hydroxy group, or a combination thereof, $0<M3<1$, $0\leq D3<1$, $0\leq T3<1$, $0\leq Q3<1$, $M3+D3+T3+Q3=1$, and D3 or T3 is greater than zero.

15. The transparent resin as claimed in claim 14, wherein M includes germanium or titanium.

16. The transparent resin as claimed in claim 14, further comprising a hydrosilation catalyst.

17. The transparent resin as claimed in claim 16, wherein the hydrosilation catalyst includes platinum, rhodium, palladium, ruthenium, iridium, or a combination thereof.

* * * * *